United States Patent [19]

Korta et al.

[11] 4,156,342
[45] May 29, 1979

[54] COOLING APPARATUS FOR A BEARING IN A GAS TURBINE

[75] Inventors: John Korta, Stoney Creek; Arthur W. Upton; John Danko, both of Hamilton; Azizullah, Longueuil, all of Canada

[73] Assignee: Westinghouse Canada Limited, Hamilton, Canada

[21] Appl. No.: 848,805

[22] Filed: Nov. 7, 1977

Related U.S. Application Data

[63] Continuation of Ser. No. 694,926, Jun. 11, 1976, abandoned.

[51] Int. Cl.² .............................................. F02C 7/06
[52] U.S. Cl. .................................. 60/39.08; 60/39.66; 415/112; 184/6.11; 184/104 B; 308/76
[58] Field of Search ........................... 60/39.08, 39.66; 415/110-112; 184/6.11, 104 B; 308/76, 77

[56] References Cited

U.S. PATENT DOCUMENTS

| | | | |
|---|---|---|---|
| 2,639,579 | 5/1953 | Willgoos | 60/39.08 |
| 2,680,001 | 6/1954 | Batt | 184/6.11 |
| 2,744,722 | 5/1956 | Orr | 184/6.11 |
| 3,347,553 | 10/1967 | Schweiger | 60/39.08 |
| 3,527,054 | 9/1970 | Hemsworth | 60/39.08 |
| 4,046,223 | 9/1977 | McHugh | 60/39.08 |

Primary Examiner—Robert E. Garrett
Attorney, Agent, or Firm—R. H. Fox; E. H. Oldham

[57] ABSTRACT

This invention relates to a method of thermally isolating a bearing located near the combustion region in a gas turbine. Air is bled from an intermediate stage of the compressor turbine and is arranged to be fed to the central pipe of a coaxial piping arrangement which leads to the bearing housing. The housing for the bearing is arranged to have cooling air passages located therein to allow the air to circulate around and thus isolate the various parts of the bearing from the hot ambient. The air which has thereby acquired heat is subsequently lead back to the coaxial piping arrangement and is fed outwardly through the turbine in the space between the outer pipe and the central pipe.

4 Claims, 4 Drawing Figures

COOLING APPARATUS FOR A BEARING IN A GAS TURBINE

This is a continuation, of application Ser. No. 694,926 filed 6-11-76, now abandoned.

CROSS REFERENCE TO RELATED APPLICATIONS

United States Application Ser. No. 697021, filed 6/17/76, now U.S. Pat. No. 4,097,187, in the name of John Korta, entitled Adjustable Vane Assembly For A Gas Turbine.

United States Application Ser. No. 840898, filed 10/11/77, in the name of John Korta, entitled Vane Rotator Assembly for a Gas Turbine Engine.

U.S. Pat. No. 4,034,358 issued July 12, 1977, in the names of John Korta and Walter R. Ward, entitled Cooling Apparatus for Split Shaft Gas Turbine.

BACKGROUND OF THE INVENTION

Certain parts of gas turbines which are located near or in the combustor region of a gas turbine require isolation in order to continue to operate. This disclosure relates to a method of cooling a bearing on the compressor turbine which because of the nature of the turbine construction (i.e. split shaft type) is located in an area close to where combustion takes place in the turbine. Bearings in this region have been cooled in the past by ducting cooling air from an intermediate stage on the compressor to the bearing to be cooled. Problems which occurred in the past generally pertain to undue heating of the cooling air whilst passing through the combustor area of the turbine and ineffective cooling of the bearing in question because of improper or insufficient air flow over the bearing surfaces.

Cooling air has been ducted up the compressor shaft to cool the bearings located in hot regions, but the problems associated with hollow or ducted shafts are many and are avoided by the present invention. It must also be remembered that any cooling air which is delivered to the region of the bearing in question must be removed from it by some suitable means, and the removal of such cooling air must be done with as little inconvenience or disruption of machine operation as possible.

SUMMARY OF THE INVENTION

This invention relates to a method of cooling an overhung bearing located in the compressor section of a gas turbine. Because of its location adjacent the combustor stage of the turbine, cooling for the bearing is essential. The bearing is manufactured to have cooling air paths through the bearing and in particular, is provided with a pair of annular air spaces through which the cooling air may move and remove heat from the surfaces of the bearing in the annular spaces.

A coaxial piping arrangement efficiently conducts air into the heat transfer spaces in the bearing and the same piping arrangement conducts the heated air away from the bearing in the cylindraceous area between the outer and inner pipe. Because the piping arrangement must pass through a very hot section of the turbine, i.e., the combustor section, the coaxial air flow arrangement functions most efficiently in that the inner pipe carrying cooler air into the bearing is effectively insulated from the heat of the combustor area by the outer pipe. Any excess heat gained by the outer pipe tends to be carried off to atmosphere, thus a minimum of the excess heat gained by the outside pipe of the coaxial pair is transferred to the inner pipe. This tends to have a minimized effect on the operation of the turbine.

DESCRIPTION OF THE PREFERRED EMBODIMENT OF THE INVENTION

Figure 1:
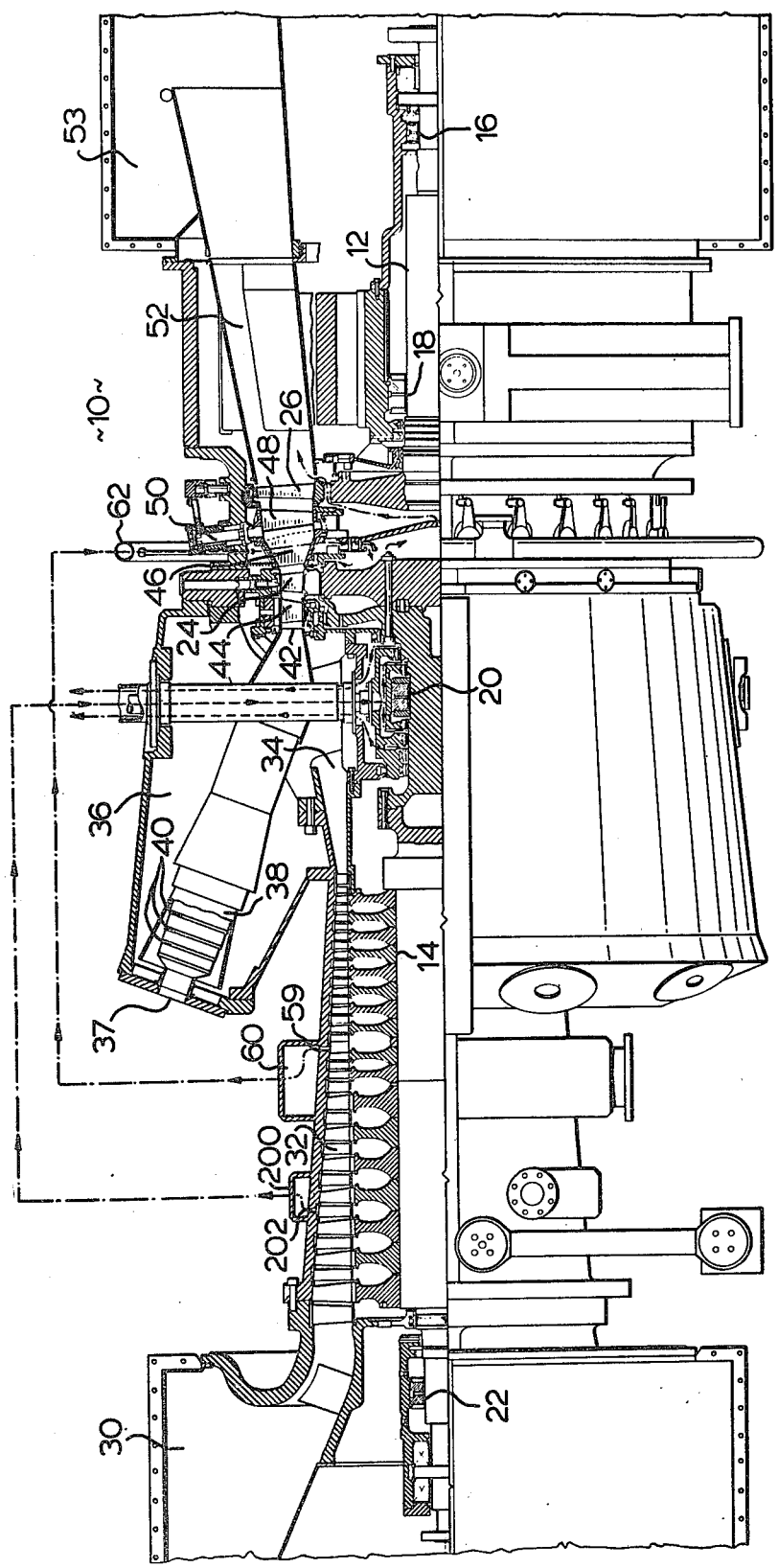
FIG. 1 is a partial sectional view of the gas turbine to which this invention applies.
Figure 2:
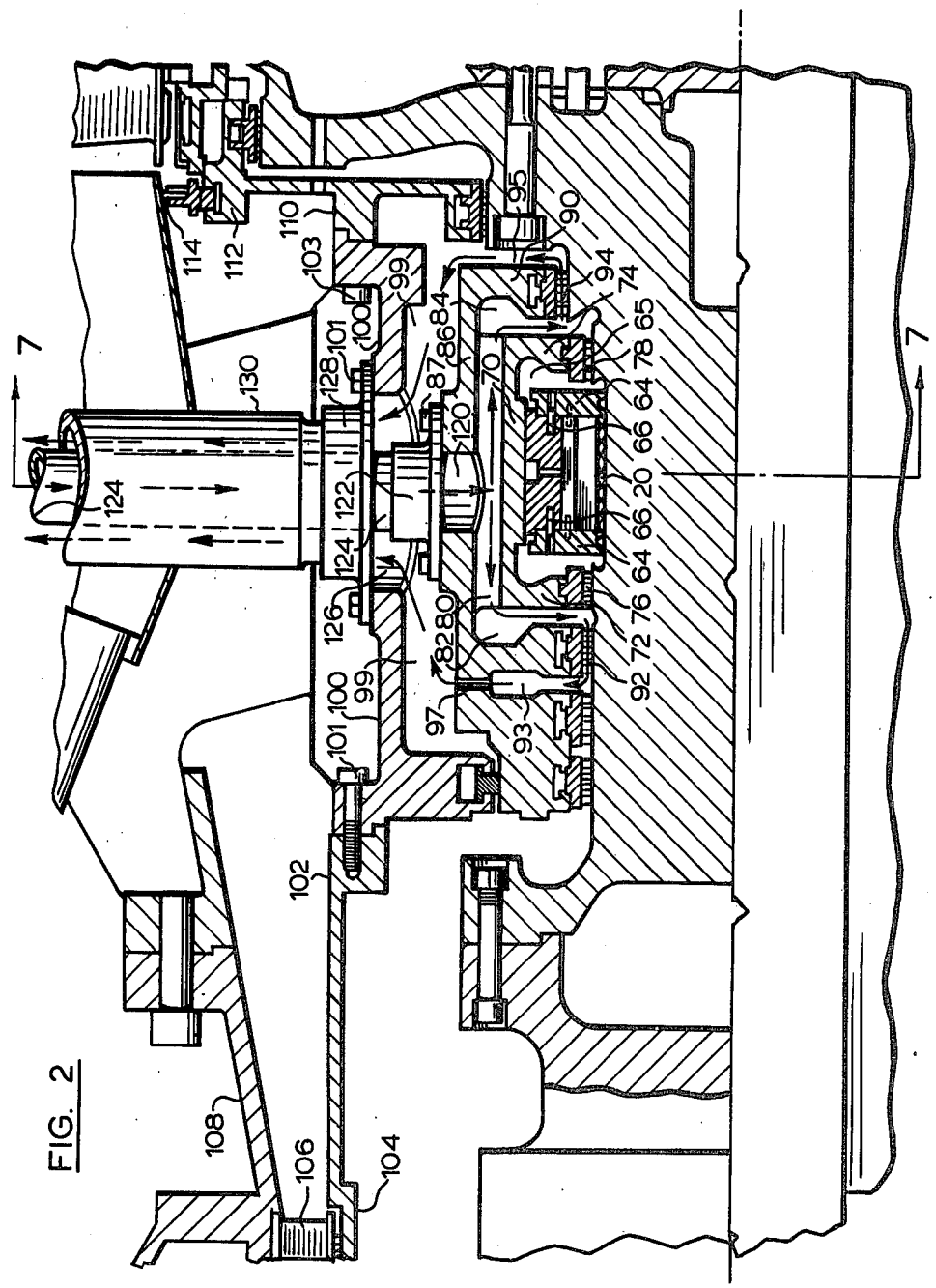
FIG. 2 is a partial sectional view of the compressor bearing of the turbine.

Referring now to FIG. 1, it will be seen that a "double shafted" or "split-shaft" turbine 10 is shown, having output power shaft 12 and compressor shaft 14. Power output shaft 12 is journalled in bearing 16 and 18 and compressor shaft 14 is journalled in bearings 20 and 22. Power to drive the compressor section of the compressor turbine is supplied by blades 24. The power blades 26 are provided to drive output shaft 12 to supply power to a load.

As the operation of the complete turbine is fairly obvious to those skilled in the art only a brief description of the overall turbine will be given here.

Air is supplied to intake plenum 30 and is subsequently drawn into the compressor stages 32 and compressed. When the air passes through the last blades of the compressor stage it will have attained a pressure of 90-100 psi. At this time the compressed air is ducted through outlet 34 into the combustor casing 36 of the turbine. Turbine fuel is supplied to fuel inlets 37 of the turbine baskets 38 and the compressed air is passed through passages 40 in baskets 38 where it is mixed with the atomized fuel and is subsequently burned. The hot burning gas passes through the basket outlet 42 and is passed through a set of vanes 44. The gas then passes through the power blades 24 to drive the compressor section, and the gas exits into another set of stationary vanes 46. It will be seen that a set of movable vanes 48 are shown cooperating with the stationary blades 46. Vanes 48 are provided with activators 50 which allow them to pivot through a small angle to provide changes in the direction of the gas passing therethrough. The redirected hot gas thence passes through blades 26 which drive the output shaft 12 to provide output power from the turbine. The hot exhaust gas thence passes through an exhaust diffuser 52 and then into an exhaust plenum 53.

Before proceeding further it will be expedient to describe some of the mechanical hardware which pertains to the bearing 20 of this invention.

Bearing 20 is of the Kingsbury (a trademark) type having a number of bearing pads 20 mated with the bearing surface of shaft 14. The bearing pads 20 are mounted in the bearing housing 60 so as to transmit bearing forces to the member 60 at points such as the one shown at 62. A pair of bearing retaining rings 64 are provided with dowel means 66 to hold pads 20 in their proper location. An oil groove 68 is provided in member 60 for lubrication purposes.

Member 60 is secured in housing 70 by means of dowels or any other suitable locking means. Housing 70 is a complex casting having a pair of annular shaped members 72 and 74 formed integrally therein. Members 72 and 74 are fitted with a pair of labyrinth seals 76 and 78 which are in close spaced relationship to shaft 14. Housing 70 is provided with an internal air passage 80 which is connected to a pair of annular shaped air passages 82 and 84. The outer part of housing 70 which is formed integrally therewith and for convenience is labelled 86 is of a cylindraceous nature is provided with a pair of annularly shaped members 88 and 90 formed integrally therewith. Members 88 and 90 are fitted with a pair of labyrinth seals 92 and 94.

Figure 3:
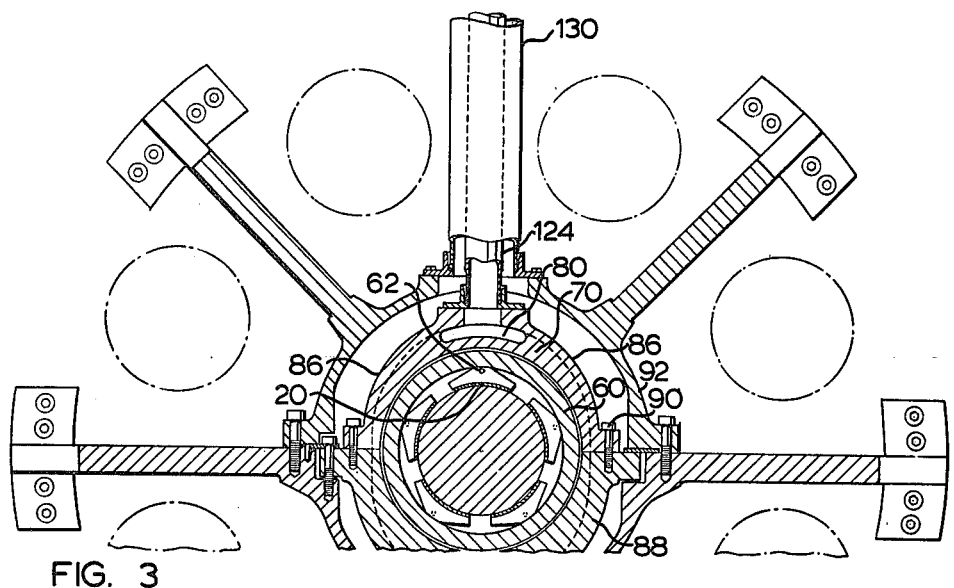
FIG. 3 is a sectional view through the section 3—3 of FIG. 2.
Figure 4:
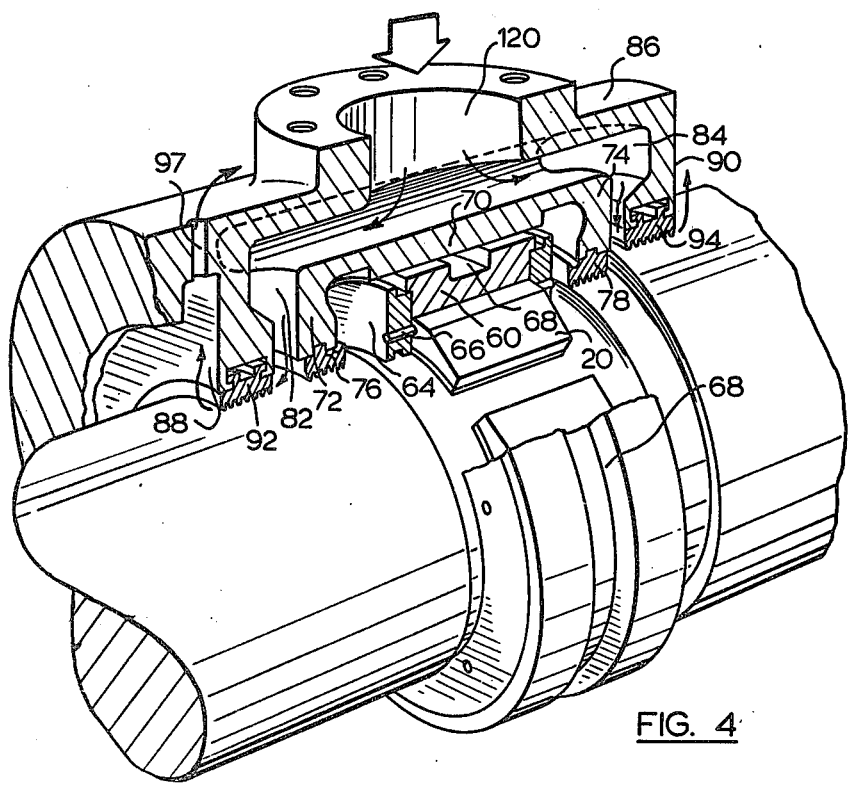
FIG. 4 is a partial perspective of a section of the compressor bearing of this invention.

Member 86 is securely fastened to member 88 by means of bolts 90 (see FIG. 3) and bolts both sections 86 and 88 are secured in housing 92 by any suitable means. Housing 90 is made in a split manner for manufacturing and assembling reasons and a further description of the mechanical hardware holding the bearing housing 86 in place would be superfluous except to say that the bearing housing 86 must be held firmly in place by the outer housing 100 which is mechanically connected to the member 102 by bolts 101 and to member 110 by bolts 103 for securing bearing 20 in place.

Housing 86 is provided with an aperture 120 which aperture is in communication with the opening in a hollow flange member 122 which is fastened to housing 86 by means of bolts 87. A pipe 124 is fitted into flange member 122 in a sealed relationship.

Housing 100 is similarly provided with an aperture 126 which is in communication with the opening of a hollow flange member 128. Bolts 101 secure flanges 128 to housing 100. A pipe member 130 is mounted in flange 128 in a sealed relationship. Pipe 130 is arranged to be concentric and coaxial with pipe 124.

The method of cooling bearing 20 is as follows. Provision is made to bleed a portion of the compressed air from an intermediate compressor stage at housing 200. Suitable bleed holes 202 in the compressor housing supply compressed air to the housing. Suitable conduit members are provided between the housing 200 and intake pipe 124 to lead the compressed air from the housing to the flange member 122. The compressed air passes through aperture 120 into passage 80 and into annular spaces 82 and 84. Part of the compressed air passes through labyrinth seals 76 and 78 into the bearing assembly and will pass out of the bearing through an oil discharge line (not shown). Most of the compressed air in spaces 82 and 84 will pass through labyrinth seals 92 and 94 into spaces 93 and 95. The air from annular passageway 93 is led through a series of holes 97 to passageway 99 and the air in space 95 is directly led into space 99 where it passes into flange 128 and is ducted to atmosphere or some suitable heat sink via pipe 130.

It is easily seen that the compressed air delivered to the bearing via pipe 124 is made to almost encircle the bearing housing 70 and 86 in order to provide a barrier to heat transfer into the bearing 20.

It will be seen that having coaxial pipes 124 and 130 in concentric relationship provides additional advantages. Because it is necessary to duct the cooling air through combustor area 36 the outer pipe 130 is subjected to very high temperatures. The coaxial arrangement of pipes allows pipe 130 and its cooling air passing therethrough to act as an insulator for pipe 124. This means that pipe 124 delivers cooler air to the bearing housing 70 than would have been possible had pipe 130 not been in concentric relationship therewith.

The coaxial arrangement also simplifies the mechanical construction of the turbine in that both intake and exhaust pipes are in the same area whereas the alternative solution which would be to use two separate pipes, one for intake and one for the exhaust causes undue complications due to the additional space requirements necessitated by this arrangement.

Although other methods of thermally isolating bearings which of necessity must operate in high temperature regions are well known, it is believed that the method disclosed in this application is superior in performance and the mechanical construction relatively simple.

The embodiments of the invention in which an exclusive property or privilege is claimed are defined as follows:

1. A method of cooling a bearing in a location adjacent the combustor section in a gas turbine engine comprising, bleeding compressed air from an intermediate stage of the compressor section of said engine, feeding said compressed air into the inner pipe of a coaxial pair of pipes which passes from a point outside the casing of said turbine through said casing and through said combustor section to the housing of said bearing, said housing having a pair of separated channels therein, a first channel being in communication with said inner pipe of said coaxial pair, said first channel delivering cooling air to a pair of annular shaped recesses therein, where the cooling air is heated, bleeding said heated cooling air from said annular recesses to a central gathering passage, which passage is in communication with the outer pipe of said coaxial pair, passing substantially all said heated cooling air through said outer pipe to atmosphere.

2. A gas turbine engine comprising a stator casing having at least one rotor suitably journalled in bearings mounted in said casing, said rotor having compressor blading means for compressing inlet air in said turbine engine, said compressed inlet air subsequently being mixed with fuel and burned in the combustor section of said turbine engine to produce a swiftly moving hot gas stream, power blading means on said rotor member for extracting power from said hot gas stream, at least one of said bearings being mounted in said casing in an area adjacent said combustor section of said turbine, said bearing having a housing having air passages therein to permit the passage of cooling air through said bearing housing, said housing having an inner passage connected to annular shaped recess means surrounding central region of said bearing, wherein said cooling air is heated during passage therethrough, an outer passage and second recess means in said bearing housing for collecting heated cooling air from said annularly shaped recess means, said second recess means being connected to said annularly shaped recess means by air flow restriction means, a single coaxial conduit means passing radially through said combustor section of said turbine for feeding and returning substantially all said cooling air to and from said bearing housing, the inner conduit of said coaxial conduit means being supplied with cooling air for delivery to said bearing housing, said inner conduit being in communication with said inner passage means, the outer conduit of said coaxial conduit means for delivery of heated cooling air away from said bearing housing to a point outside said casing, said outer conduit serving to isolate said inner conduit from exposure of the heated environment of said combustor section of said turbine engine.

3. The method of cooling a bearing as claimed in claim 1 wherein the gas turbine is an industrial type gas turbine and the bearing being cooled is of the Kingsbury type.

4. The gas turbine of claim 2 wherein the gas turbine is of an industrial type and the said bearing is of the Kingsbury type.

* * * * *